US010260692B2

(12) United States Patent
Belliveau

(10) Patent No.: US 10,260,692 B2
(45) Date of Patent: Apr. 16, 2019

(54) THEATRICAL INSTRUMENT WITH IMPROVED SUBTRACTIVE COLOR MIXING SYSTEM

(71) Applicant: Richard S. Belliveau, Austin, TX (US)

(72) Inventor: Richard S. Belliveau, Austin, TX (US)

( * ) Notice: Subject to any disclaimer, the term of this patent is extended or adjusted under 35 U.S.C. 154(b) by 125 days.

(21) Appl. No.: 15/653,603

(22) Filed: Jul. 19, 2017

(65) Prior Publication Data

US 2019/0024860 A1 Jan. 24, 2019

(51) Int. Cl.

| | |
|---|---|
| ***F21V 9/40*** | (2018.01) |
| ***A63J 17/00*** | (2006.01) |
| ***F21S 10/00*** | (2006.01) |
| ***F21S 10/02*** | (2006.01) |
| ***F21V 14/08*** | (2006.01) |
| ***G02B 26/00*** | (2006.01) |
| ***H05B 37/02*** | (2006.01) |
| ***F21W 131/406*** | (2006.01) |

(52) U.S. Cl.

CPC .............. *F21S 10/026* (2013.01); *F21V 9/40* (2018.02); *F21V 14/08* (2013.01); *G02B 26/007* (2013.01); *A63J 17/00* (2013.01); *F21S 10/007* (2013.01); *F21W 2131/406* (2013.01); *H05B 37/029* (2013.01)

(58) Field of Classification Search

CPC ......... F21S 10/026; F21S 10/007; F21V 9/40; F21V 14/08; F21V 9/08; G02B 26/007; A63J 17/00; F21W 2131/406; H05B 37/029

USPC ........................... 362/236, 268, 84, 231, 233

See application file for complete search history.

(56) References Cited

U.S. PATENT DOCUMENTS

| | | | | |
|---|---|---|---|---|
| 4,600,976 | A | 7/1986 | Callahan | |
| 4,602,321 | A | 7/1986 | Bornhorst | |
| 4,914,556 | A | 4/1990 | Richardson | |
| 4,962,687 | A | 10/1990 | Belliveau et al. | |
| 5,073,847 | A | 12/1991 | Bornhorst | |
| 5,126,886 | A | 6/1992 | Richardson et al. | |
| 8,282,245 | B2 | 10/2012 | Hough | |
| 2003/0206414 | A1* | 11/2003 | Wood ...................... | F21S 10/02 362/293 |

* cited by examiner

*Primary Examiner* — Wei (Victor) Chan

(74) *Attorney, Agent, or Firm* — Walter J. Tencza, Jr.

(57) ABSTRACT

An apparatus for a theatrical lighting instrument including a light source, which emits light in a light path; a lens located in the light path, and which receives light from the light source and projects light from the light source; a computer memory; and a computer processor. The apparatus may also include first pluralities and second pluralities of cyan, magenta and yellow color filters, each filter including a variable density color filter operated upon by a motor configured to traverse each filter in and out of the light path. Each variable density color filter of the first pluralities of filters may include a high saturation color pallet. Each variable density color filter of the second pluralities of filters may include a low saturation color pallet. The computer memory may include software to multiplex the traversing of the first and the second pluralities of filters to one or more control channels.

22 Claims, 9 Drawing Sheets

D6
502
500
504
D5
D4
506a
D7
D8
518a
506
508
508a
510
510a
512
512a
514
514a
516
516a
518
520a
520
522a
522
524a
524
526a
526
528a
528
530

D6
502
500
504
D5
D4
506a
D7
D8
D7
D8
518a
506
518
508
508a
520a
520
510
510a
522a
522
512
512a
524a
524
514
514a
526a
526
516
516a
528a
528
530

D6
502
500
504
D5
D4
506a
D7
D8
D7
D8
518a
506
508
508a
510
510a
512
512a
514
514a
516
516a
518
520a
520
522a
522
524a
524
526a
526
528a
528
530

D6
502
500
504
D5
D4
506a
D7
D8
D7
D8
518a
506
518
508
508a
520a
520
510
510a
522a
522
512
512a
524a
524
514
514a
526a
526
516
516a
528a
528
530

1200
506
508
510
512
514
516
518
520
522
524
526
528
1214
1260
1250
1228
1240
1244
1262
1264
1266
1232
1234
1236
1238
1242
1239

THEATRICAL INSTRUMENT WITH IMPROVED SUBTRACTIVE COLOR MIXING SYSTEM

FIELD OF THE INVENTION

This invention relates to multiparameter lighting fixtures.

BACKGROUND OF THE INVENTION

Multiparameter lighting fixtures are lighting fixtures, which illustratively have two or more individually remotely adjustable parameters such as focus, color, image, position, or other light characteristics. Multiparameter lighting fixtures are widely used in the lighting industry because they facilitate significant reductions in overall lighting system size and permit dynamic changes to the final lighting effect. Applications and events in which multiparameter lighting fixtures are used to great advantage include showrooms, television lighting, stage lighting, architectural lighting, live concerts, and theme parks.

Multiparameter lighting fixtures are commonly constructed with a lamp housing that may pan and tilt in relation to a base housing so that light projected from the lamp housing can be remotely positioned to project on a stage surface. The lamp housing of the multiparameter light contains the optical components such as a lamp and includes color filters for varying the color of the projected light. Commonly a plurality of multiparameter lights are controlled by an operator from a central controller. The central controller is connected to communicate with the plurality of multiparameter lights via a communication system.

U.S. Pat. No. 4,962,687 to Belliveau, describes a variable color lighting system and instrument that uses an additive color mixing method to fade from one color to another. The lighting instrument is comprised of three lamps each emitting a different wavelength of light in the colors of red, green and blue that can be added together to vary the color of the projected light.

The use of dichroic filters to color the light projected by a multiparameter theatre lighting instrument is known in the art. U.S. Pat. No. 4,392,187 to Bornhorst, discloses the use of dichroic filters in a multiparameter light. Bornhorst discloses "The dichroic filters transmit light incident thereon and reflect the complement of the color of the transmitted beam. Therefore, no light is absorbed and transformed to heat as found in the prior art use of celluloid gels. The use of a relatively low power projection lamp in lights 30 and 110 substantially reduces the generation of infrared radiation which causes high power consumption and heat buildup within prior art devices." While the use of color wheels that support multiple wavelengths of dichroic filters to color the light of a multiparameter stage light is still in common practice, it is also common practice to construct a multiparameter light having variable density dichroic filter flags that gradually color the light using a subtractive color method. The subtractive color method may use the dichroic filter flag colors of cyan, magenta and yellow to gradually and continuously vary the color of today's multiparameter stage light producing a pleasing color fade when visualized by an audience. The gradual and continuous varying of cyan, magenta and yellow in the light path of a multiparameter light is referred to as "CMY color mixing" in the theatrical art.

U.S. Pat. No. 6,687,063 to Rasmussen discloses a dichroic color mixing flag in FIGS. 8 and 12 with dichroic etched fingers that operate to produce a variable color as they are translated across the light created by the optical path.

U.S. Pat. No. 8,220,969 to Bornhorst describes a color changing structure for a theatrical instrument that is a wheel that varies saturation from its outside towards its inside.

Bornhorst describes the limitations of the known CMY color mixing systems as follows: "A CYM mixing system can be formed using three patterned color wheels that subtractively create color in a way that is similar to that used by the print industry. Three cylindrical circular glass wheels are each coated, respectively, with cyan, magenta, and yellow, e.g. using a dichroic filter stack. The wheels are patterned using photolithographic and chemical etch techniques to remove parts of the filter coating and selected areas. The completed wheel has a completely uncoated area that allows white light to pass. At the opposite extreme, the wheel has a completely coated area that fully saturates the color of the beam. A density patterned area is in between the two, which has a variable saturation gradient.

The wheels may be used in pairs or in triples to create partial color limited continual color range. For example, the magenta wheel may be used in combination with the yellow wheel, to generate the entire range of yellow to orange to red to magenta colors.

While this system produces good color, the inventor has recognized that this system is inherently limited in the color space it can produce. A color space is defined by the cyan, yellow and magenta filters. The color space can be modified by selecting different color points for the filters, but the space remains limited. The inventor recognized that this is particularly weak in producing saturated colors." (Bornhorst, col. 2, ln. 48-col. 3, ln. 5)

Present day light sources for theatrical instruments are primarily comprised of light emitting diodes (LEDs). One such theatrical instrument using a high power white LED light source is the SolaWash 2000 by High End Systems of Austin, Tex. found at https://www.highend.com/products/lighting/solawash. This high power white LED lighting instrument varies the color of the projected light using a CMY color mixing system, which is known. The diameter of the light path from the white LED source that is created by the optics where the light path travels through the CMY color mixing flags is approximately 50 millimeters (mm). Unfortunately the large diameter light path excludes the invention described by Bornhorst because a wheel diameter of the Bornhorst invention would need to approximate 300 millimeters (mm) in diameter to be effective and efficient.

Present day theatrical lighting designers can be disappointed by the known CMY color mixing system. Not only does the known CMY color mixing system have a limited saturation color pallet, the known CMY color mixing system is also compromised in the ability to create a wide color pallet of pastels. Pastels colors are requirement in theatre and opera where lighting designers can feel that pastel colors are less distracting to an audience and are better for skin tones.

SUMMARY OF THE INVENTION

There is a need for an improved CMY color mixing system that can produce a wide range of saturated and less saturated colors in a theatrical instrument using modern white LED light source.

In at least one embodiment, an apparatus for a theatrical lighting instrument is provided comprising a light source, which emits light in a light path; a lens which is located in the light path, and which receives light from the light source and projects light from the light source; a computer memory; and a computer processor.

The apparatus may also include a first plurality of cyan color filters each comprised of a variable density color filter operated upon by a motor configured to traverse each of the first plurality of cyan color filters in and out of the light path; a first plurality of magenta color filters each comprised of a variable density color filter operated upon by a motor configured to traverse each of the first plurality of magenta color filters in and out of the light path; and a first plurality of yellow color filters each comprised of a variable density color filter operated upon by a motor configured to traverse each of the first plurality of yellow color filters in and out of the light path.

The apparatus may also include a second plurality of cyan color filters each comprised of a variable density color filter operated upon by a motor configured to traverse each of the second plurality of cyan color filters in and out of the light path; a second plurality of magenta color filters each comprised of a variable density color filter operated upon by a motor configured to traverse each of the second plurality of magenta color filters in and out of the light path; and a second plurality of yellow color filters each comprised of a variable density color filter operated upon by a motor configured to traverse each of the second plurality of yellow color filters in and out of the light path.

In at least one embodiment, each variable density color filter of each of the first plurality of yellow color filters, cyan color filters, and magenta color filters is comprised of a high saturation color pallet. In at least one embodiment, each variable density color filter of each of the second plurality of yellow color filters, cyan color filters, and magenta color filters is comprised of a low saturation color pallet.

The computer memory may include operating software operational to multiplex the traversing of the first plurality and the second plurality of cyan filters to a single first control channel; operating software operational to multiplex the traversing of the first plurality and the second plurality of magenta filters to a single second control channel; and wherein the computer memory comprises operating software operational cause the computer processor to multiplex the traversing of the first plurality and the second plurality of yellow filters to a single third control channel; wherein the first, the second and the third single control channels may be different from one another.

The computer processor may be programmed by computer software stored in the computer memory to cause the first plurality of cyan color filters to be traversed into the light path before the second plurality of cyan color filters is traversed into the light path.

The computer processor may be programmed by operating software stored in the computer memory to cause the first plurality of magenta color filters to be traversed into the light path before the second plurality of magenta color filters is traversed into the light path.

The computer processor may be programmed by operating software stored in the computer memory to cause the first plurality of yellow color filters to be traversed into the light path before the second plurality of yellow color filters is traversed into the light path.

In at least one embodiment, an apparatus for a theatrical lighting instrument is provided comprising a light source, which emits light in a light path; a lens which is located in the light path, and which receives light from the light source and projects light from the light source; a computer memory; a computer processor; and a communications port.

The apparatus may further include a first plurality of cyan color filters each comprised of a variable density color filter operated upon by a motor configured to traverse each of the first plurality of cyan color filters in and out of the light path; a first plurality of magenta color filters each comprised of a variable density color filter operated upon by a motor configured to traverse each of the first plurality of magenta color filters in and out of the light path; and a first plurality of yellow color filters each comprised of a variable density color filter operated upon by a motor configured to traverse each of the first plurality of yellow color filters in and out of the light path.

The apparatus may further include a second plurality of cyan color filters each comprised of a variable density color filter operated upon by a motor configured to traverse each of the second plurality of cyan color filters in and out of the light path; a second plurality of magenta color filters each comprised of a variable density color filter operated upon by a motor configured to traverse each of the second plurality of magenta color filters in and out of the light path; and a second plurality of yellow color filters each comprised of a variable density color filter operated upon by a motor configured to traverse each of the second plurality of yellow color filters in and out of the light path.

The computer memory may include operational software to cause the computer processor to multiplex the first plurality and the second plurality of color filters to operate by a hue command and saturation command received by the communication port. The hue command may be a sixteen bit command and the saturation command may be a sixteen bit command.

In at least one embodiment, an apparatus for a theatrical lighting instrument is provided comprising a light source, which emits light in a light path; a lens which is located in the light path, and which receives light from the light source and projects light from the light source; a computer memory; a computer processor; and a communications port.

The apparatus may further include a first plurality of cyan color filters each comprised of a variable density color filter operated upon by a motor configured to traverse each of the first plurality of cyan color filters in and out of the light path; a first plurality of magenta color filters each comprised of a variable density color filter operated upon by a motor configured to traverse each of the first plurality of magenta color filters in and out of the light path; a first plurality of yellow color filters each comprised of a variable density color filter operated upon by a motor configured to traverse each of the first plurality of yellow color filters in and out of the light path.

The apparatus may further include a second plurality of cyan color filters each comprised of a variable density color filter operated upon by a motor configured to traverse each of the second plurality of cyan color filters in and out of the light path; a second plurality of magenta color filters each comprised of a variable density color filter operated upon by a motor configured to traverse each of the second plurality of magenta color filters in and out of the light path; and a second plurality of yellow color filters each comprised of a variable density color filter operated upon by a motor configured to traverse each of the second plurality of yellow color filters in and out of the light path.

Each of the first plurality of magenta color filters, the first plurality of yellow color filters, and the first plurality of cyan color filters is comprised of a high saturation color pallet; and each of the second plurality of magenta color filters, the second plurality of yellow color filters, and the second plurality of cyan color filters is comprised of an low saturation color pallet.

In at least one embodiment, the computer memory comprises operating software which is executed by the computer processor to cause the first plurality of yellow, cyan, and magenta filters to traverse independently into the light path by first, second, and third DMX control channels respectively.

In at least one embodiment, the computer memory further comprises operating software which is executed by the computer processor to cause the second plurality of yellow, cyan and magenta filters to traverse independently into the light path by fourth, fifth and sixth DMX control channels respectively.

The apparatus may further include a user control panel configured so that a user can select from the control panel a mode wherein multiplexing operational software stored in the computer memory is used by the computer processor to consolidate the traversing of the first plurality of cyan filters and the traversing of the second plurality of cyan filters in response to a first DMX channel of control.

The user control panel may be configured so that a user can select from the control panel a mode wherein multiplexing operational software stored in the computer memory is used by the computer processor, wherein in the mode, all of the first plurality and the second plurality of cyan filters are controlled by the computer processor to be consolidated and responsive to a first channel of DMX control, wherein in the mode, all of the first plurality and the second plurality of magenta filters are controlled by the computer processor to be consolidated and responsive to a second channel of DMX control; and wherein in the mode all of the first plurality and the second plurality of yellow filters are controlled by the computer processor to be consolidated and responsive to a third channel of DMX control.

In another embodiment, in the selected mode, one or more of the first plurality and the second plurality of cyan filters are controlled by the computer processor to be moved in a manner to provide coarse adjustment of cyan filtering by a first coarse channel of DMX control and fine cyan adjustment of cyan filtering by a first fine channel of DMX control; one or more of the first plurality and the second plurality of magenta filters are controlled by the computer processor to be moved in a manner to provide coarse adjustment of magenta filtering by a second coarse channel of DMX control and fine magenta adjustment of magenta filtering by a second fine channel of DMX control; and all of the first plurality and the second plurality of yellow filters are controlled by the computer processor to be moved in a manner to provide coarse adjustment of yellow filtering by a third coarse yellow channel of DMX control and fine adjustment of yellow filtering by a third fine channel of DMX control;

In another embodiment, in the selected mode, one or more of the first plurality and the second plurality of cyan filter, one or more of the first plurality and the second plurality of magenta filters, and one or more of the first plurality and the second plurality of yellow filters are controlled by the computer processor to be moved in a manner to provide hue adjustment of filtering by a hue channel of DMX control and saturation adjustment of filtering by a saturation channel of DMX control; and wherein the hue channel of DMX control and the saturation channel of DMX control differ from each other.

One or more embodiments provide a method comprising the steps of multiplexing the traversing of a first plurality and a second plurality of cyan filters in an out of a light path of a light emitted by a light source, to a single first control channel; multiplexing the traversing of a first plurality and a second plurality of magenta filters in an out of the light path of the light emitted by the light source, to a single second control channel; and multiplexing the traversing of a first plurality and a second plurality of yellow filters in an out of the light path of the light emitted by the light source, to a single third control channel. The method may be implemented using the structure and/or means previously described.

In at least one embodiment a method is provided including multiplexing a first plurality and a second plurality of color filters to operate by a hue command and saturation command received by a communication port.

In at least one embodiment a method is provided which includes causing a first plurality of yellow, cyan, and magenta filters to traverse independently into a light path by first, second, and third DMX control channels respectively; and causing a second plurality of yellow, cyan and magenta filters to traverse independently into the light path by fourth, fifth and sixth DMX control channels respectively.

The method may further include selecting a mode from a control panel to cause multiplexing operational software stored in a computer memory to be executed by a computer processor to consolidate the traversing of the first plurality of cyan filters and the traversing of the second plurality of cyan filters in response to a first DMX channel of control.

The method may include selecting a mode from a control panel to cause multiplexing operational software stored in a computer memory to be executed by a computer processor to consolidate the traversing of the first plurality of cyan filters and the traversing of the second plurality of cyan filters in response to a first DMX channel of control.

The method may include selecting a mode from a control panel to cause multiplexing operational software stored in a computer memory to be executed by a computer processor to consolidate the traversing of the first plurality of cyan filters and the traversing of the second plurality of cyan filters in response to a first DMX channel of control.

The method may include selecting a mode from a control panel to cause multiplexing operational software stored in a computer memory to be executed by a computer processor to consolidate the traversing of the first plurality of cyan filters and the traversing of the second plurality of cyan filters in response to a first DMX channel of control.

DETAILED DESCRIPTION OF THE DRAWINGS

Figure 1:
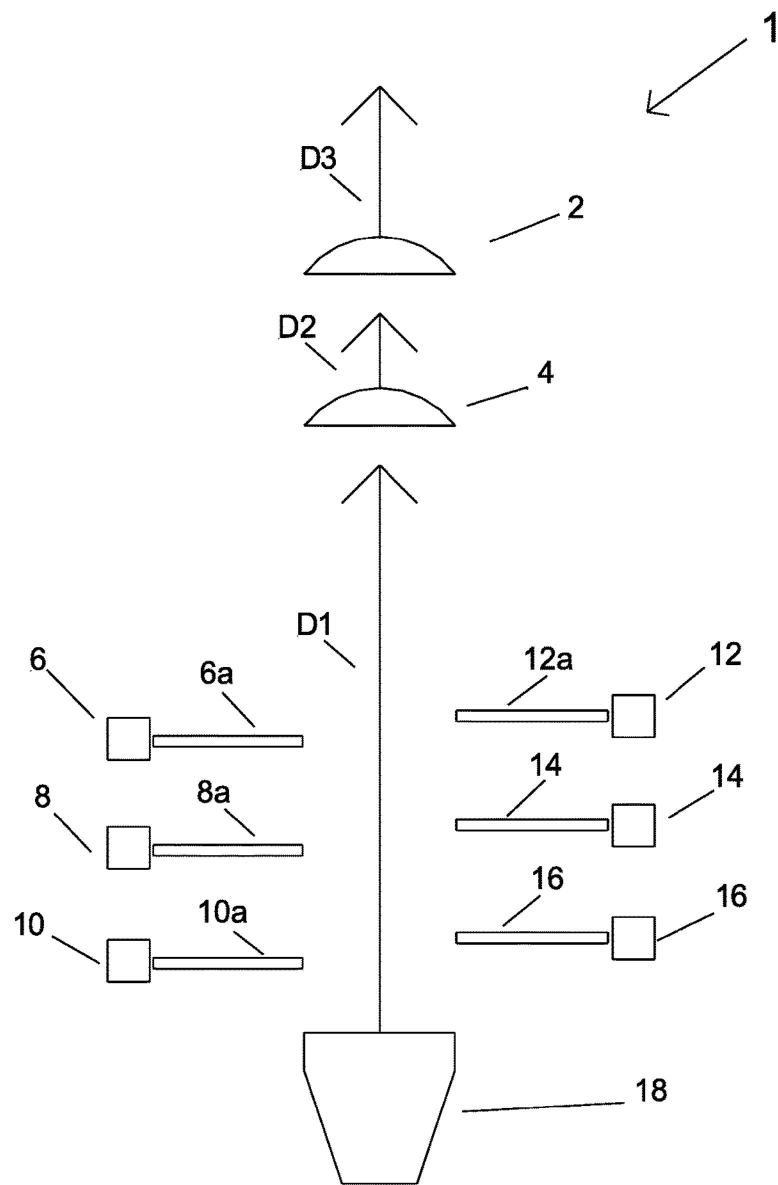
FIG. 1 is a simplified diagram of a known CMY color mixing system using color mixing flags with variable density color.

FIG. 1 shows a prior art CMY color mixing system, apparatus, and method 1, using color mixing flags with variable density color. The system, apparatus, and method, includes a light source 18. The light source 18 emits light, in a light path and/or direction D1. The system, apparatus, and method further includes a focus lens 4, and a zoom lens 2. The system, apparatus, and method 1 further includes motors 6, 8, 10, 12, 14, and 16 for translating respective color mixing flags 6*a*, 8*a*, 10*a*, 12*a*, 14*a*, and 16*a*, respectively, into the light path of D1. The mechanical system or linkage for connecting each motor, of motors 6, 8, 10, 12, 14, and 16 to its respective color mixing flag to drive the translation and/or traversal of the particular color mixing flag into the light path of D1, such as including a timing belt and pulley, is not shown for simplification and is known in the art Flags 6*a* and 12*a* may be cyan colored flags; flags 8*a* and 14*a* may be magenta colored flags; and flags 10*a* and 16*a* may be yellow colored flags.

Figure 2:
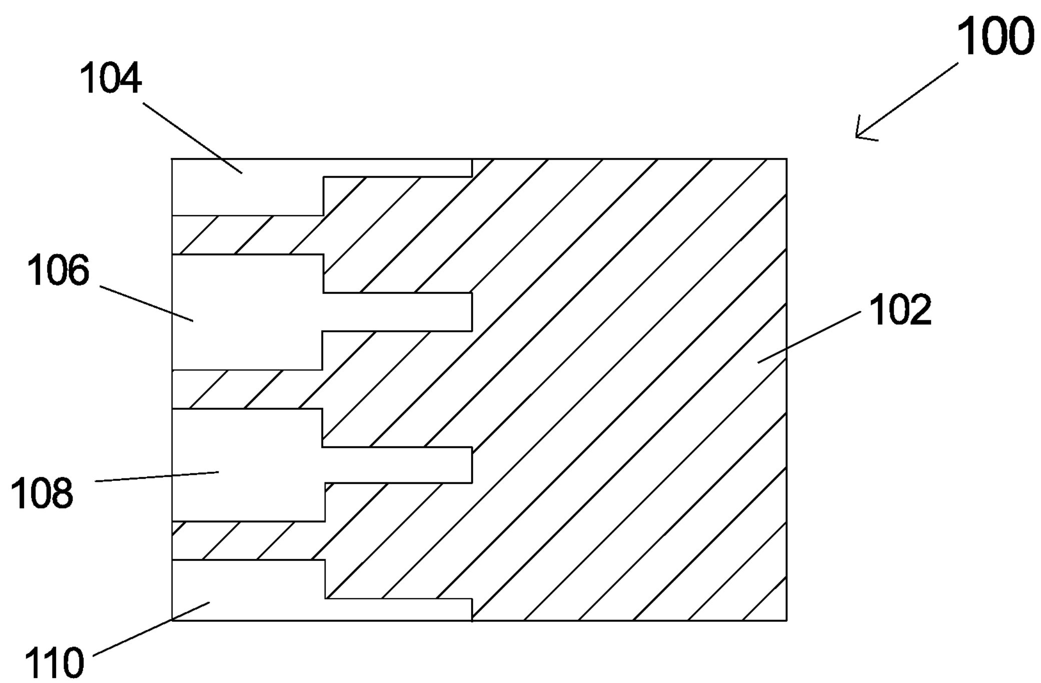
FIG. 2 is a simplified diagram of a known color mixing flag.

FIG. 2 shows a prior art color mixing flag that is a variable density color filter 100. The hatched area 102 is a transmissive color media that varies in density by reducing to small fingers 104, 106, 108, and 110.

Figure 3A:
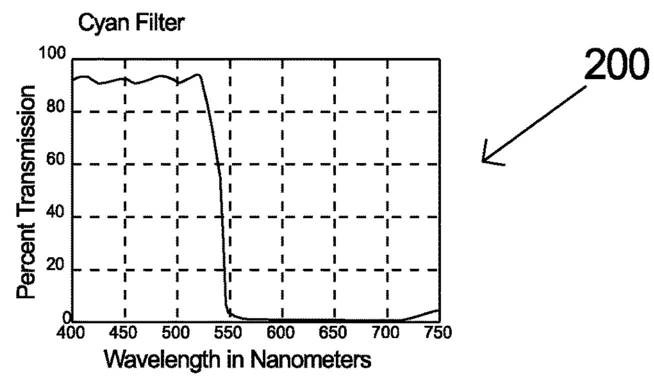
FIGS. 3A, 3B, and 3C show the typical transmissive wavelengths for Cyan, Magenta and Yellow that is applied to the type of color mixing flag of FIG. 2.
Figure 3B:
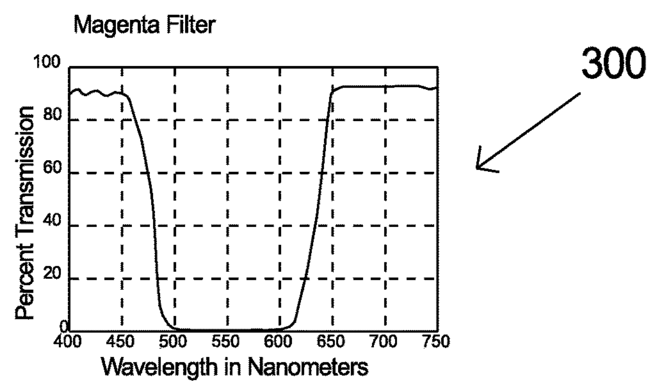
Figure 3C:
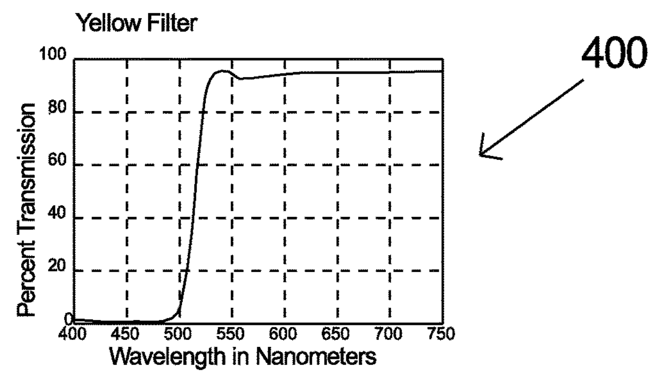

FIGS. 3A, 3B, and 3C shows typical transmissive wavelengths for Cyan, Magenta and Yellow, respectively, that is applied to the type of color mixing flag 100 of FIG. 2. For the cyan filter color point of the prior art, 540 nanometers (nm) is selected to produce a cyan color that is not too blue because as known in the art this would limit the ability to produce a green with wide band width. For example, when as known in the prior art, the cyan color flags, such as 6*a* and 12*a*, are fully traversed into the light path, such as light path of D1, along with the yellow color flags 10*a* and 16*a*, the remaining green colored light projected by the prior art lighting instrument of FIG. 1, after passing through the flags 6*a*, 12*a*, 10*a*, and 16*a*, set by the 540 nanometer (nm) cut off of the cyan filter of the color flags 6*a* and 12*a* and the 520 nanometer (nm) cutoff of the yellow filter of the flags 10*a* and 16*a*, leaves a resultant green colored light of 520 nanometers (nm) to 540 nanometers (nm). The magenta filter color points of 457 nm and 630 nm of the prior art are selected to provide a reasonable magenta color while also providing the color red with a color point of 630 nm projected light when the magenta and yellow filters are both traversed fully into the light path of D1. A filter or flag is said to be fully into a light path, such as D1, when full saturation is reached, so that no light in the path D1 is passing through the areas 104, 106, 108 and 110 of 100 in FIG. 2 and all the light from the path D1 passes though only the color area 102. Generally, the concept of having a filter or flag "fully" into a light path is known in the art.

Figure 4:
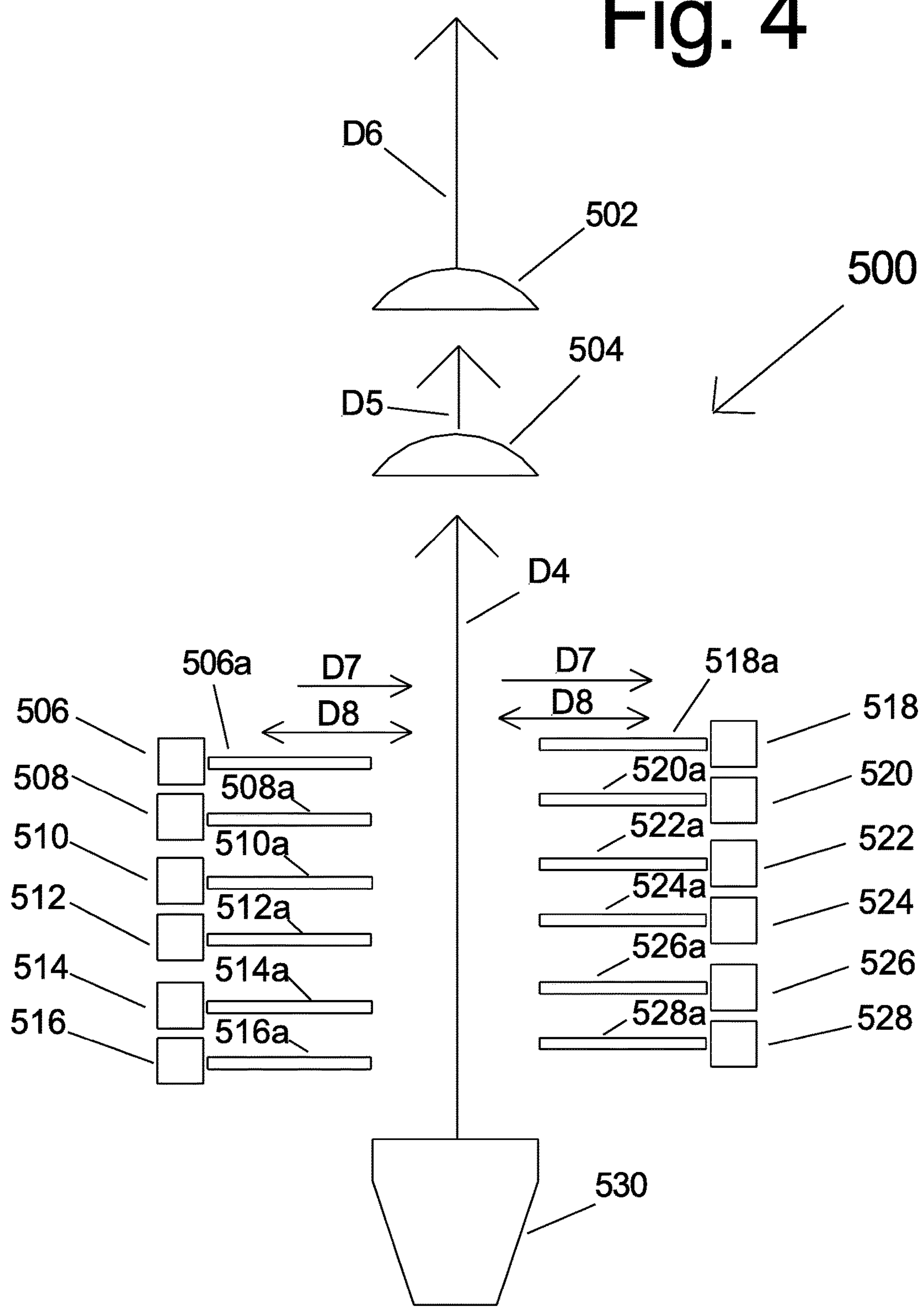
FIG. 4 shows an improved CMY color mixing system, apparatus and method in accordance with an embodiment of the present invention for a theatrical instrument, with the apparatus of FIG. 4 in a first state in which no color filter flags are in a light path.

When the cyan with a color point of 540 nm and the magenta with the color points of 457 nm and 630 nm are fully traversed into the light path D1, as known in the prior art, the resultant color blue color point is at 457 nm. The compromised CMY color system with resultant color points at 630 nm for red, 520 nm to 540 nm for green and 457 nm for blue can't achieve the desired saturated hues. Further because of the desire for the prior art CMY color system to achieve saturated colors this results in a diminished ability to produce low saturation colors (pastels). The design of the prior art CMY color system is to produce almost fully saturated colors with some ability to produce low saturation pastels, and is at best a compromise. CMY color systems are described as "idealized" at http://hyperphysics.phy-astr.gsu.edu/hbase/vision/subcol.html FIG. 4 shows an improved CMY color mixing system, apparatus, and method 500, for a theatrical instrument in accordance with an embodiment of the present invention, with the apparatus 500 in a first state in which no color filter flags are in the light path D4. The apparatus 500 includes a light source 530. The apparatus 530 further includes, starting from the light source 530 and moving upwards, in the direction D4 of light emitted from the light source 530, a first set of yellow flags 516*a* and 528*a*, a second set of yellow flags 514*a* and 526*a*, a first set of magenta flags 512*a* and 524*a*, a second set of magenta flags 510*a* and 522*a*, a first set of cyan flags 508*a* and 520*a*, and a second set of cyan flags 506*a* and 518*a*. The apparatus 500 also includes lens 504 and lens 502. The light emitted from light source 530 in a a direction and with a light path D4, goes through lens 504, and comes out in a direction and in a light path D5, goes through lens 502 and comes out in a direction and in a light path D6.

Figure 7:
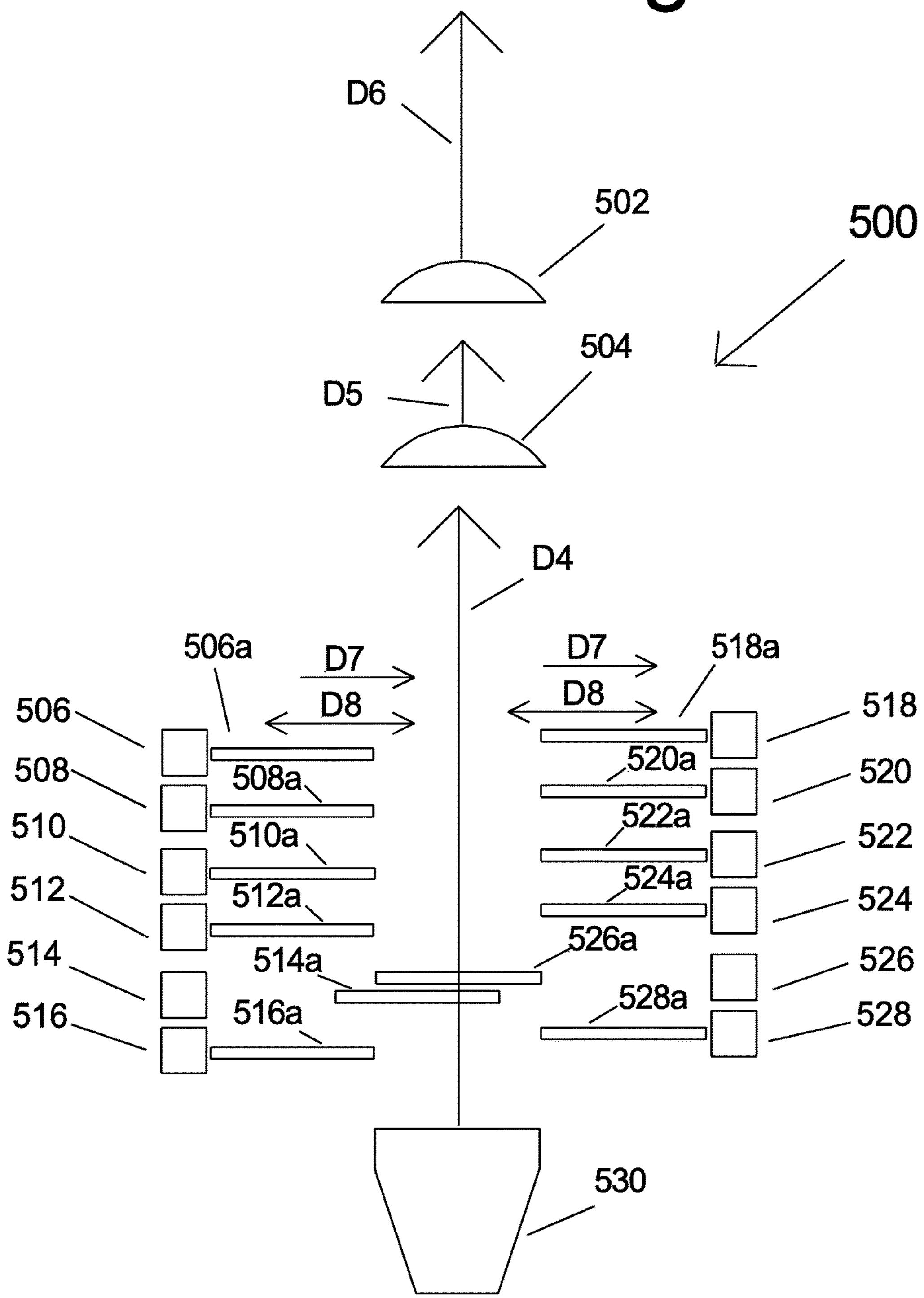
FIG. 7 shows the apparatus, method, and system of FIG. 4, in a second state, with a first set of yellow low saturation filters traversed into the light path.
Figure 8:
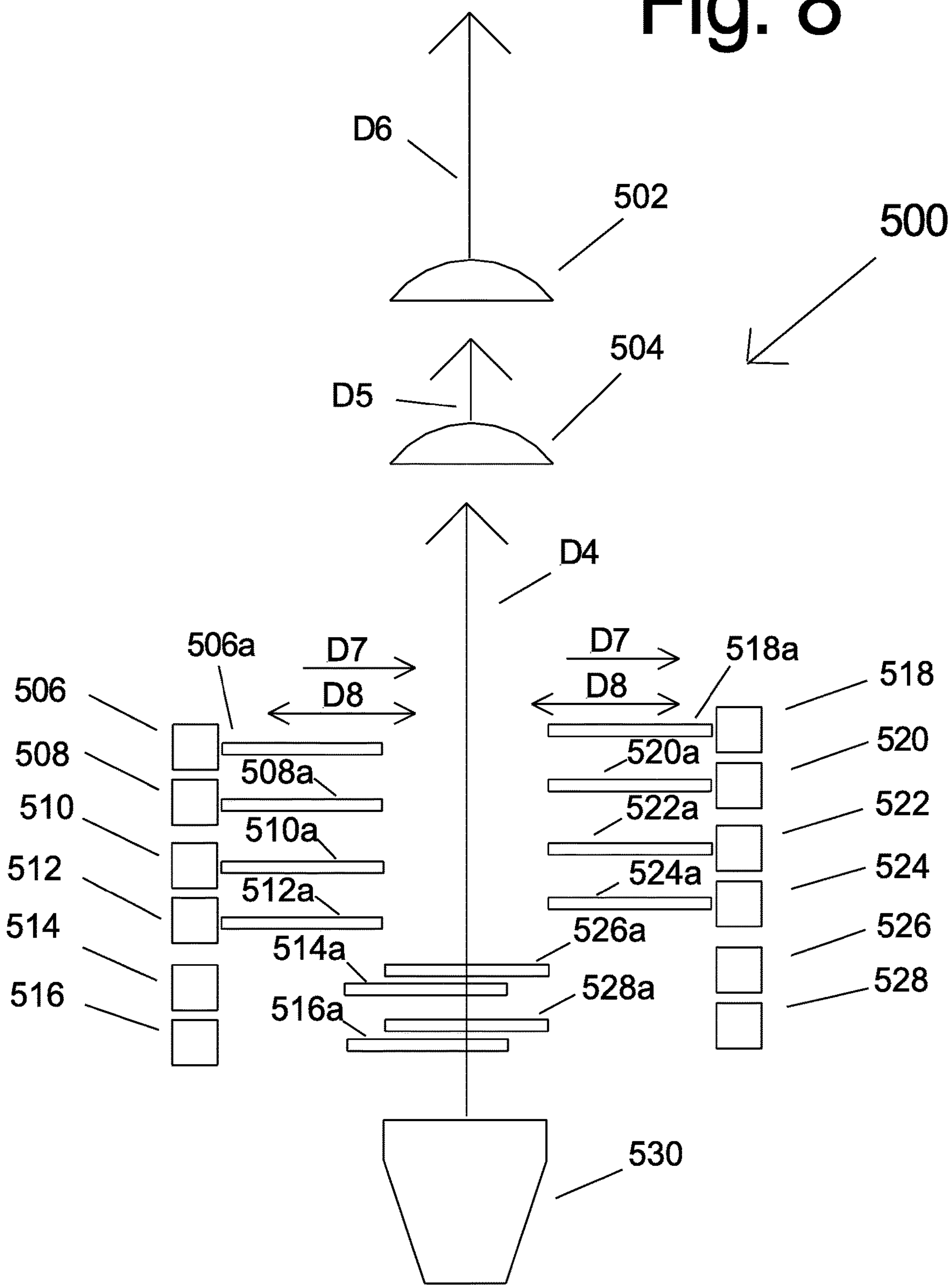
FIG. 8 shows the apparatus, method and system of FIG. 4, in a third state, with a first set of yellow high saturation filters traversed into the light path.

Each of the flags or filters 506*a*, 508*a*, 510*a*, 512*a*, 514*a*, 516*a*, 518*a*, 520*a*, 522*a*, 524*a*, 526*a*, and 528*a* can be moved either in the directions D7 or in the directions D8, as will be described (as shown in FIGS. 4, 7, and 8), by the motor or motor devices 506, 508, 510, 512, 514, 516, 518, 520, 522, 524, 526, and 528, respectively. The flags on the left in FIGS. 4, 7, and 8 are configured to be moved in the direction D7 from the first state of FIG. 4, into the path D4, until they are completely in the path of D4, and then moved out of the path in the direction of D8 until they are back in the first state of FIG. 4. The flags on the right in FIGS. 4, 7, and 8 are configured to be moved in the direction D8 from the first state of FIG. 4, into the path D4, until they are completely in the path of D4, and then moved out of the path in the direction of D7, until they are back in the first state of FIG. 4.

Each of the first set of CMY flags (cyan flags 508*a*, 520*a*, magenta flags 512*a*, and 524*a*, yellow flags 516*a*, and 528*a*) has color points and saturation designated for a high saturation color pallet. Each of the second set of CMY flags (cyan flags 506*a* and 518*a* magenta flags 510*a*, and 522*a* and yellow flags 514*a* and 526*a*, has color points and saturation designed for low saturation and the creation of pastels.

The apparatus 500 further includes motor devices 506, 508, 510, 512, 514, 516, 518, 520, 522, 524, 526, and 528, which may include a motor and related components for causing the respective flags 506*a*, 508*a*, 510*a*, 512*a*, 514*a*, 516*a*, 518*a*, 520*a*, 522*a*, 524*a*, 526*a*, and 528*a*, to be moved in or out of the light path D4, such as by translation or traversing in or out of the light path or direction D4.

Figure 5A:
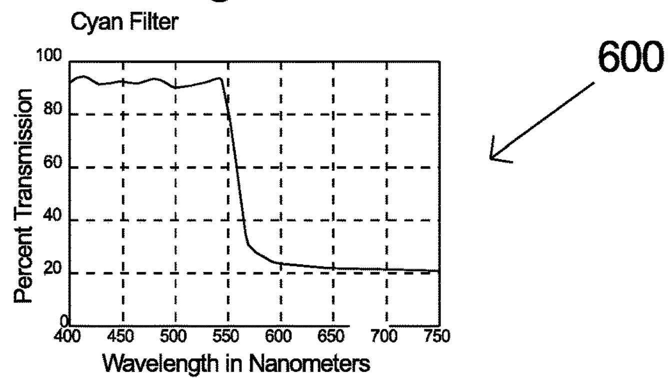
FIGS. 5A, 5B, and 5C show the color points selected for the improved low saturation CMY system, apparatus, and method, of FIG. 4, to enable the creation of a wide range of pastels.
Figure 5B:
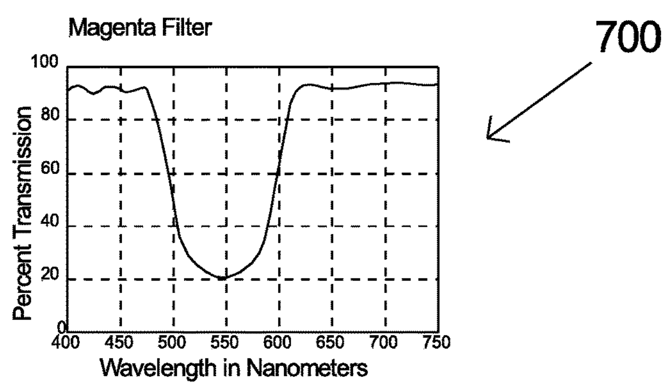
Figure 5C:
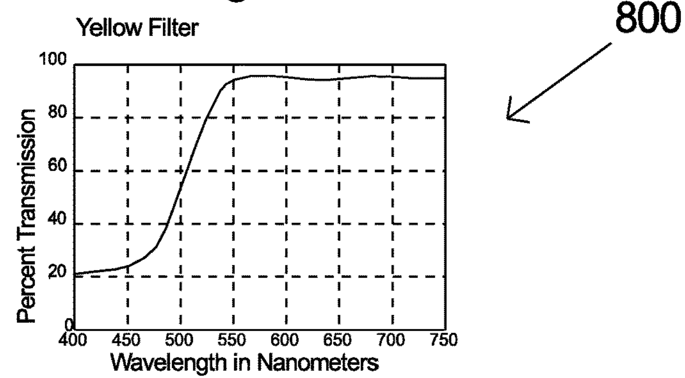

FIGS. 5A, 5B, and 5C show diagrams 600, 700, and 800, respectively, of the color points selected for the improved low saturation CMY apparatus, system, and method 500 of FIG. 4 to enable the creation of a wide range of pastels.

The cyan color point of 565 nm and the lower saturation of the cyan filter flags 506*a* and 518*a* enable a greater range of unsaturated blues and greens to be created.

The magenta color points of 470 nm and 595 nm and the lower saturation of the magenta filter flags 510*a* and 522*a* allow a greater range of light blues and ambers to be created.

The yellow color point of 500 nm along with the low saturation of the yellow filter flags 514*a*, 526*a*, allows a greater range of unsaturated greens and reds to be created.

Figure 6A:
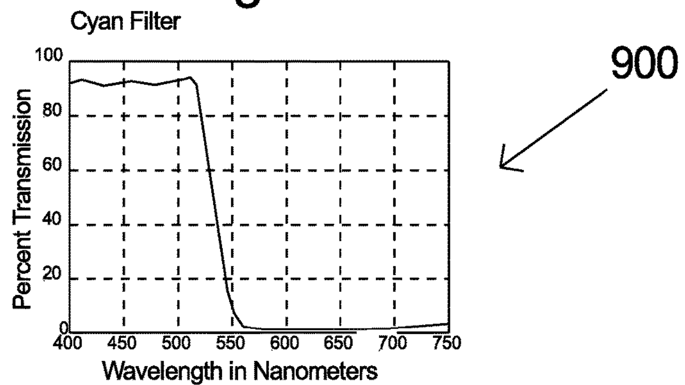
FIGS. 6A, 6B, and 6C shows the color points selected for the improved high saturation CMY system, apparatus, and method of FIG. 4, to aid in the creation of saturated colors.
Figure 6B:
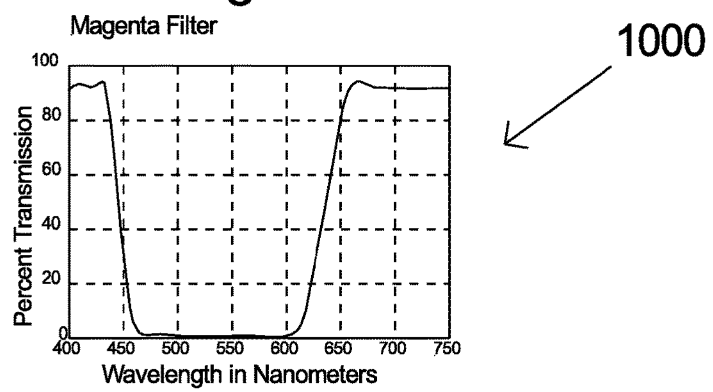
Figure 6C:
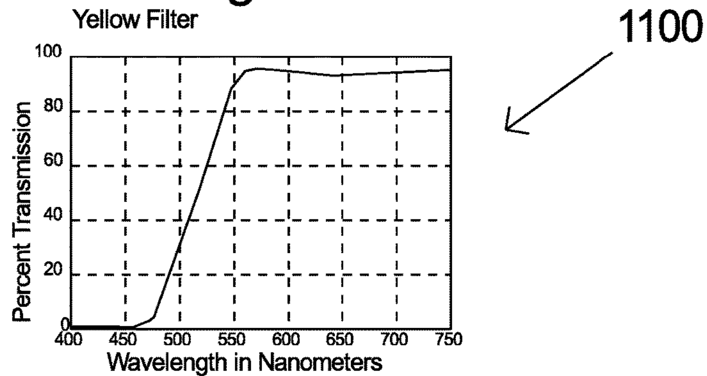

FIGS. 6A, 6B, and 6C show diagrams 900, 1000, and 1100, respectively, of the color points selected for the improved high saturation to aid in the creation of saturated colors.

The cyan color point of 535 nm and the high saturation of the cyan filter flags 508*a* and 520*a* enable a greater range of saturated blues and greens to be created.

The magenta color points of 445 nm and 645 nm and the high saturation of the magenta filter flags 512*a* and 524*a* allow a greater range of saturated dark blues and dark reds to be created.

The yellow color point of 520 nm and the high saturation of the yellow filter flags 516*a* and 528*a* allow a greater range of deep saturated greens and reds to be created.

FIG. 7 shows the improved CMY color mixing system, apparatus, and method 500, for a theatrical instrument in accordance with an embodiment of the present invention, with the apparatus 500 in a second state, in which yellow second set color filter flag 514*a* and yellow second set color filter flag 526*a* have been moved, translated, and/or traversed by motor devices 514 and 516 into the light path D4. The flags 514*a* and 526*a* may be low saturation filters. The low saturation filter color points aid in the ability of the theatrical lighting instrument to create and mix a wide range of pastels not previously available from the prior art CMY FIG. 8 shows the improved CMY color mixing system, apparatus, and method 500, with the apparatus in a third state in which the first set of yellow high saturation filters 516*a* and 528*a*, and the second set yellow low saturation color filter flags 514*a* and 526*a* have been moved, translated, or traversed into the light path D4.

In at least one embodiment it is critical that the low saturation flags move into the path of the light before the high saturation flags. For example, typically a white light color filter or flag is moved into a path of light first, then move a low saturation filter flag into the light path because it is the lightest color. Then more and more of the lightest color is added into the light path until it is completely in the color area 102 of 100 of FIG. 2. Then next high saturation flags are brought in so that more and more color saturates the light path.

The high saturation filter color points aid in the ability of the theatrical lighting instrument to create and mix a wide range of saturates not previously available from the prior art CMY The prior art theatrical instruments that are comprised of CMY color mixing systems, apparatus and method, are controlled by a central controller as known in the art. The control protocol is the DMX512 standard and protocol as described https://en.wikipedia.org/wiki/DMX512 The DMX512 commands art transmitted over the RS485 standard as described here: https://en.wikipedia.org/wiki/RS-485

Also it is known to have a second communication port on the theatrical instruments as described by U.S. Pat. No. 6,459,217, to Belliveau, incorporated by reference herein. The known theatrical instrument may communicate and receive commands on the second communication port using the Art-Net communications protocol that transmits the DMX512 standard.

The central controller has groups of potentiometer or digital sliders and or rotary wheels (user input devices). In the known art one wheel (or slider) is assigned to cyan, one wheel (or slider) is assigned to magenta and one wheel (or slider) is assigned to cyan when controlling a theatrical instrument comprised of a CMY system of the prior art. The central controller may also convert the control of the CMY of the theatrical instrument of the prior art to HS (hue and saturation). In any case both control of CMY and HS by the central controller in the prior known art expect only one CMY system comprised of three DMX control channels as in the theatrical instrument of the prior known art. It is an advantage for the high saturation variable filters and low saturation variable filters forming the rather complex color mixing system of the invention to operate easily to the operators of the known art theatrical central controllers so therefor a consolidation of the color mixing system of the invention is envisioned that uses a multiplexing scheme furnished by operating software to enable the color mixing system of the invention to easily adapt to the present marketplace.

It is of importance in the compatibility of known theatrical lighting instruments and control systems for the color mixing system of the invention comprised of a first plurality of CMY filters having a low saturation and a second plurality of CMY filters having a high saturation that can be operated on six DMX control channels to be realized by the current theatrical controllers as a consolidated three DMX control channel CMY system of the known art but yet realizes an improved wider color pallet of saturated and unsaturated (pastels) color space.

Figure 9:
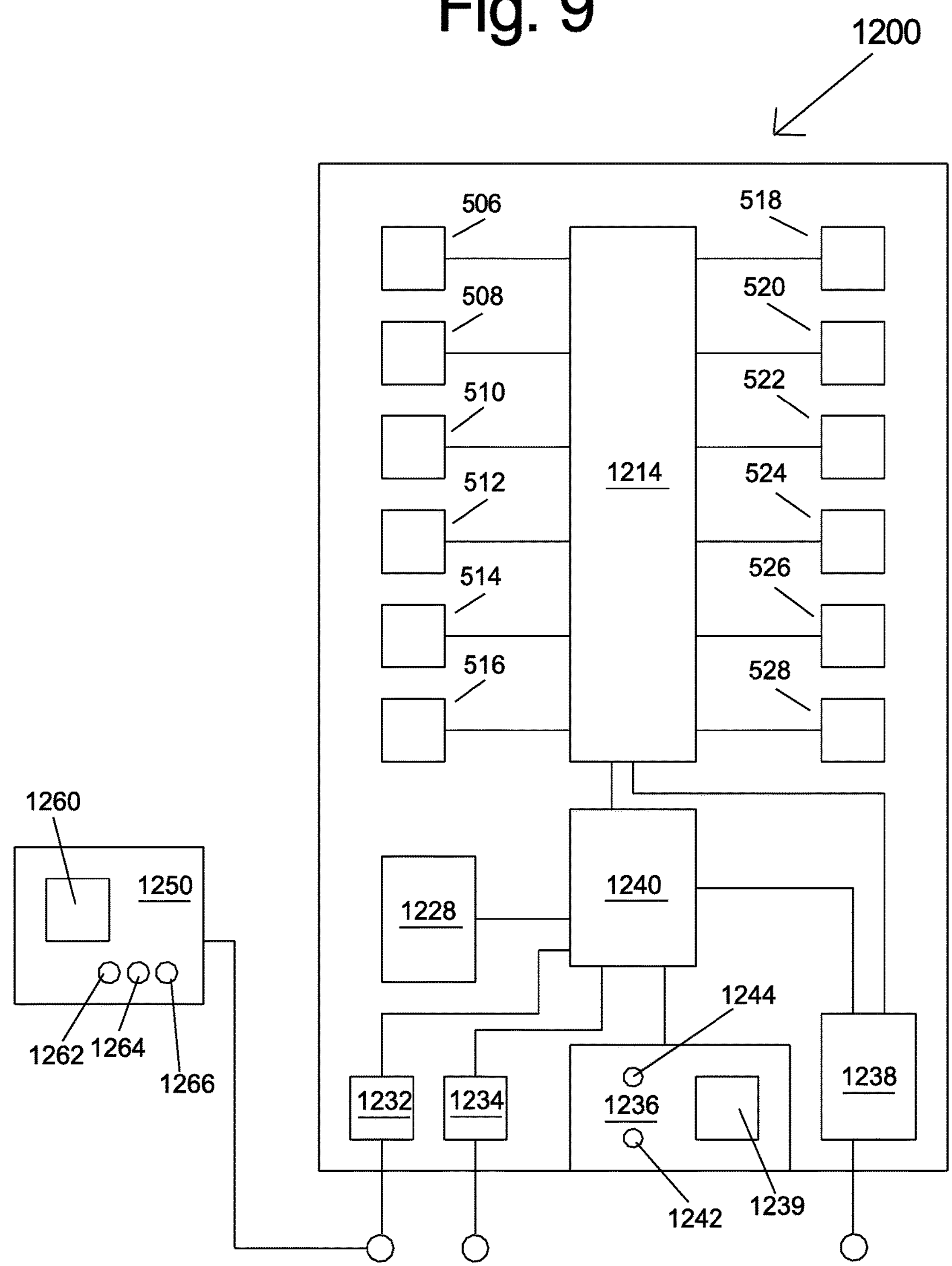
FIG. 9 shows a simplified diagram of a control system for a theatrical lighting instrument that comprises the improved CMY color mixing of at least one embodiment of the present invention.

FIG. 9 shows a control system, apparatus, and method 1200 for a theatrical lighting instrument that comprises the improved CMY color mixing of at least one embodiment of the present invention. The system, apparatus, and method includes 1200 includes the components which will be described below.

The CMY system motors and/or motor devices 506, 508, 510, 512, 514, 516, 518, 520, 522, 524, 526, and 528 that traverse the improved CMY color mixing system are shown in simplified form The motors and/or motor devices traverse the CMY cyan flag 506*a*, cyan flag 508*a* cyan, magenta flag 510*a*, magenta flag 512*a*, yellow flag 514*a*, yellow flag 516*a*, cyan flag 518*a*, cyan flag 520*a*, magenta flag 522*a*, magenta flag 524*a*, yellow flag 526*a*, and yellow flag 528*a*, respectively. A motor driver 1214 system for applying the electrical control signals to the motors or motor devices 506, 508, 510, 512, 514, 516, 518, 520, 522, 524, 526, and 528 is shown. A processor 1240 is shown for operating on stored operating software from the computer memory 1228. Two inputs for control signals are shown 1232 and 1234. The component 1232 is a communication node able to receive DMX command signals. The component 1234 is a communication node able to receive DMX command signals via the Art-Net protocol.

A power supply 1238 is shown for supplying power to the various logic components and the motor driver 1214 to drive the motors. An on board display and control system 1236 is shown that provides a way for an operator of the theatrical instrument 1200 to input commands or modes to the theatrical instrument 1200 by using user input devices or buttons 1242 and 1244 and visualizing the user inputs on a display screen 1239 directly and without communications over communication node 1232 or communication node 1234.

A central controller 1250 is shown. A display device 1260 is shown that allows the operator of the theatrical instrument 1200 to visualize the control the improved CMY color system. Three input devices are shown 1262, 1264 and 1266 that may be a rotary encoder wheel. Input device 1262 can control the multiplexed high and low cyan filter sets all at the same time. Input device 1264 can control the multiplexed high and low magenta filter sets all at the same time. Input device 1266 can control the multiplexed high and low yellow sets all at the same time. Under the alternative HS (hue and saturation) scheme or mode only two input devices 1260 and 1264 are needed for hue and saturation respectively.

For the CMY system of one or more embodiments of the present invention to multiplex and consolidate as one CMY system to an operator of a central controller, operating multiplexing software is stored in the computer memory 1228 of the theatrical instrument 1200 of the invention. The multiplexing operating software provides operating instructions to the computer processor 1240 to send control signals to the motor driver system 1214 to power and multiplex the high saturation and low saturation CMY system motors and/or motor devices 506, 508, 510, 512, 514, 516, 518, 520, 522, 524, 526, and 528 so that the result to an operator of the control system, apparatus and method 1200 operates to an operator of the central controller 1250 as a single CMY system with greatly expanded color pallet. The multiplexing allows for each set of low saturation and high saturation cyan mixing filters to operate on a single channel of DMX for eight bit control commands or on a coarse fine two channel DMX control commands for a higher resolution sixteen bit control. Coarse fine control for higher resolution DMX control is known in the art and described here: http://plsn.com/current-issue/10-feeding-the-machines/22975-bits-and-bobs-8-bit-vs-16-bit-dmx-control.html The command instructions received by the device 1200 for controlling the improved CMY system can be DMX command instructions, which are received by the communication port 1232 or as Art-Net at the communication port 1234.

In operation an operator controlling the central controller 1250 of FIG. 9 may first select the yellow parameter to modify as follows. The operator can select the yellow input device 1262 (which may be a rotary encoder) and rotate it and as he or she rotates the yellow input device 1262 of FIG. 9 so that a first set of low saturation yellow filters 514*a* and 526*a* of FIG. 4 are gradually moved, translated, or traversed across the light path D4, shown in FIG. 7, by motors or motor devices 514 and 526 of FIG. 4, respectively. This allows variable saturation of the low saturation yellow filters 514*a* and 526*a* and the resultant color thereof to be projected by the zoom lens 502 and focus lens 504 of FIG. 4 and/or FIG. 7. Once the full available saturation of the yellow low saturation filters 514*a* and 526*a* is realized as shown by the position of the yellow low saturation filters 514*a* and 526*a* of FIG. 7 by traversing the fully saturated color of the filter flags into the light path D4 then continued rotation of the input device 1262 by the operator such as by turning knob of input device 1262 of FIG. 9 automatically traverses the second yellow high saturation filters 516*a* and 528*a* into the light path D4, by the motors 516 and 528 respectively. In this way variable hue and saturated yellow color is projected and adjusted seamlessly by the theatre lighting instrument 1200 under control by an operator from a very low saturation to a very high saturation. The operational software stored in the memory 1228 of FIG. 9 can provide similar multiplexing instructions to the computer processor 1240 to operate the motors 506 and 518 to traverse their low saturation cyan filters 506*a* and 518*a* respectively into light path D4 and motors 508 and 520 to traverse their high saturation cyan filters 508*a* and 520*a* respectively into the light path D4.

The operational software stored in the memory 1228 of FIG. 9 can also provide similar multiplexing instructions to the computer processor 1240 to operate the motors 510 and 522 to traverse their low saturation magenta filters 510*a* and 522*a* respectively into light path D4 and motors 512 and 524 to traverse their high saturation magenta filters 512*a* and 524*a* respectively into the light path. The term multiplexing is used here to describe that a low saturation filter can traverse into the light path before a high saturation filter of the same color type and both filter types are responsive to traverse from a same DMX control channel.

The multiplexing of the CMY color mixing of the invention can also take place using an HS (Hue and Saturation) scheme or mode. The operating software stored in the memory 1228 can be designed to multiplex the three sets of high and low saturation CMY filters or flags (yellow high saturation filters or flags 516*a* and 528*a*, yellow low saturation filters or flags 514*a* and 526*a*, magenta high saturation filters or flags 512*a* and 524*a*, magenta low saturation filters or flags 510*a* and 522*a*, cyan high saturation filters or flags 508*a* and 520*a*, and cyan low saturation filters or flags 506*a* and 518*a*) so that the two pluralities of low and high saturation variable filters are consolidated to only four DMX channels. Two DMX channels for hue in coarse fine mode and two DMX channels for saturation in coarse fine mode. In this way only two input devices 1262 for hue and 1264 for saturation are required to be adjusted by an operator of the central controller 1250 of FIG. 9. As an operator rotates the input device 1262 all color mixing flags 516*a*, 528*a*, 514*a*, 526*a*, 512*a*, 524*a*, 510*a*, 522*a*, 510*a*, 522*a*, 506*a* and 518*a* respond to provide the hue selection. As an operator rotates the input device 1264 all color mixing flags 516*a*, 528*a*, 514*a*, 526*a*, 512*a*, 524*a*, 510*a*, 522*a*, 510*a*, 522*a*, 506*a* and 518*a* respond to provide the saturation level of the selected hue.

The operational software stored in the computer memory 1228 can also provide an operational software mode to provide independent control by computer processor 1240 of the first plurality of high saturation cyan filters 508*a* and 520*a* using a first DMX control channel, and independent control of the second plurality of low saturation cyan flags or filters 506*a* and 518*a* using a second DMX control channel and further providing independent control by computer processor 1240 of the first plurality of high saturation magenta filters 512*a* and 524*a* using a third DMX control channel and independent control by computer processor 1240 of the second plurality of low saturation magenta filters 510*a* and 522*a* using a fourth DMX control channel and further comprising independent control by computer processor 1240 of the first plurality of high saturation yellow filters 516*a* and 528*a* using a fifth DMX control channel and independent control by computer processor 1240 of the second plurality of low saturation yellow filters 514*a* and 526*a* using a sixth independent control channel.

The operational software stored in the memory 1228 is also configured to provide an operational software mode to provide independent control by computer processor 1240 of each and every filter flag by its corresponding motor or motor device. This requires twelve DMX channels of control. However, interesting and novel color effects can take place as left hand side color flags of one color (high or low saturation) are placed in the light path opposite right hand side color flags of a different color (high or low saturation). Alternatively effects software stored in the memory 1228 may send operational instructions to the computer processor 1240 to place the individual and independent color flags in certain orders upon commands received over one of the communications ports 1232 or 1234.

The apparatus, method, and system 500, in at least one embodiment, may be configured to work with individual motors and/or motor devices for each of the plurality of low saturation cyan, magenta and yellow filter flags and with individual motors for each of the plurality of high saturation cyan, magenta and yellow filter flags as described herein or alternatively each set of the plurality of low saturation cyan, magenta and yellow and high saturation cyan, magenta and yellow has a single motor with a linkage belt to move both flags of a set of flags at once. For example, yellow high saturation filters 516*a* and 528*a* can be linked by a belt, to move both flags 516*a* and 528*a* at once, by a single motor or motor device. The improvements to subtractive color mixing systems of theatrical lighting instruments as disclosed herein can be realized with a first plurality of cyan, magenta and yellow high saturation variable density color mixing flags and a second plurality of cyan, magenta and yellow low saturation color variable density mixing flags but can also be realized by adding reducing or increasing the numbers of the amount of low saturation and or high saturation variable density color mixing flags.

It is an advantage for the consolidation of the plurality of high saturation color mixing flags and the plurality of low saturation color mixing flags to be multiplexed by operating software stored in the computer memory 1228 of FIG. 9 as disclosed. However it is also possible to produce software to be stored within the central controller 1250 that by using an individual DMX channel for each of the plurality of high saturation and low saturation color mixing flags the central controller internally multiplexes to consolidate and simplify the color mixing of the invention to an easier to understand and operate CMY or HS.

In the present application "consolidate" filter flags, such as, for example, "consolidating" filter flags 514*a* and 526*a* of FIG. 7, means, in at least one embodiment, that the filter flags are related by computer software in computer memory 1228, so that the movement of the filter flags will be coordinated. For example, filter flag sets 514*a* and 526*a* and 516*a* and 528*a* can be "consolidated" so that filter flags 514*a* and 526*a* move into the light path D4 first and before filter flags 516*a* and 528*a* in response to one control signal or one channel. Filter flags 514*a* and 526*a* could also be "consolidated" by computer software to move filter flag 514*a* into the light path D4 first, and then to move filter flag 526*a* next into the light path D4, to gradually provide a certain amount of filtering in response to a one control signal or one channel. Computer software in computer memory 1228 which groups and/or consolidates filter flags together may specify an order for moving filter flags into light path D4, and other information for relating the movement of the grouped filter flags together.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus for a theatrical lighting instrument comprising a light source, which emits light in a light path;

a lens which is located in the light path, and which receives light from the light source and projects light from the light source;

a computer memory;

a computer processor;

a first plurality of cyan color filters each comprised of a variable density color filter operated upon by a motor configured to traverse each of the first plurality of cyan color filters in and out of the light path;

a first plurality of magenta color filters each comprised of a variable density color filter operated upon by a motor configured to traverse each of the first plurality of magenta color filters in and out of the light path;

a first plurality of yellow color filters each comprised of a variable density color filter operated upon by a motor configured to traverse each of the first plurality of yellow color filters in and out of the light path;

a second plurality of cyan color filters each comprised of a variable density color filter operated upon by a motor configured to traverse each of the second plurality of cyan color filters in and out of the light path;

a second plurality of magenta color filters each comprised of a variable density color filter operated upon by a motor configured to traverse each of the second plurality of magenta color filters in and out of the light path;

a second plurality of yellow color filters each comprised of a variable density color filter operated upon by a motor configured to traverse each of the second plurality of yellow color filters in and out of the light path;

wherein each variable density color filter of each of the first plurality of yellow color filters, cyan color filters, and magenta color filters are comprised of a high saturation color pallet;

wherein each variable density color filter of each of the second plurality of yellow color filters, cyan color filters, and magenta color filters are comprised of a low saturation color pallet;

wherein the computer memory comprises operating software operational to multiplex the traversing of the first plurality and the second plurality of cyan filters to a single control channel wherein the computer memory comprises operating software operational to multiplex the traversing of the first plurality and the second plurality of magenta filters to a single control channel; and wherein the computer memory comprises operating software operational cause the computer processor to multiplex the traversing of the first plurality and the second plurality of yellow filters to a single control channel.

2. The apparatus for the theatrical lighting instrument of claim 1 wherein the computer processor is programmed by computer software stored in the computer memory to cause the first plurality of cyan color filters to be traversed into the light path before the second plurality of cyan color filters is traversed into the light path.

3. The apparatus for the theatrical lighting instrument of claim 1 wherein the computer processor is programmed by operating software stored in the computer memory to cause the first plurality of magenta color filters to be traversed into the light path before the second plurality of magenta color filters is traversed into the light path.

4. The apparatus for the theatrical lighting instrument of claim 1 wherein the computer processor is programmed by operating software stored in the computer memory to cause the first plurality of yellow color filters to be traversed into the light path before the second plurality of yellow color filters is traversed into the light path.

5. An apparatus for a theatrical lighting instrument comprising a light source, which emits light in a light path;

a lens which is located in the light path, and which receives light from the light source and projects light from the light source;

a computer memory;

a computer processor;

a communications port;

a first plurality of cyan color filters each comprised of a variable density color filter operated upon by a motor configured to traverse each of the first plurality of cyan color filters in and out of the light path;

a first plurality of magenta color filters each comprised of a variable density color filter operated upon by a motor configured to traverse each of the first plurality of magenta color filters in and out of the light path;

a first plurality of yellow color filters each comprised of a variable density color filter operated upon by a motor configured to traverse each of the first plurality of yellow color filters in and out of the light path;

a second plurality of cyan color filters each comprised of a variable density color filter operated upon by a motor configured to traverse each of the second plurality of cyan color filters in and out of the light path;

a second plurality of magenta color filters each comprised of a variable density color filter operated upon by a motor configured to traverse each of the second plurality of magenta color filters in and out of the light path;

a second plurality of yellow color filters each comprised of a variable density color filter operated upon by a motor configured to traverse each of the second plurality of yellow color filters in and out of the light path;

and wherein the computer memory includes operational software to cause the computer processor to multiplex the first plurality and the second plurality of color filters to operate by a hue command and saturation command received by the communication port.

6. The apparatus for the theatrical lighting instrument of claim 5 wherein wherein the hue command is a sixteen bit command and the saturation command is a sixteen bit command.

7. An apparatus for a theatrical lighting instrument comprising a light source, which emits light in a light path;

a lens which is located in the light path, and which receives light from the light source and projects light from the light source;

a computer memory;

a computer processor;

a communications port;

a first plurality of cyan color filters each comprised of a variable density color filter operated upon by a motor configured to traverse each of the first plurality of cyan color filters in and out of the light path;

a first plurality of magenta color filters each comprised of a variable density color filter operated upon by a motor configured to traverse each of the first plurality of magenta color filters in and out of the light path;

a first plurality of yellow color filters each comprised of a variable density color filter operated upon by a motor configured to traverse each of the first plurality of yellow color filters in and out of the light path;

a second plurality of cyan color filters each comprised of a variable density color filter operated upon by a motor configured to traverse each of the second plurality of cyan color filters in and out of the light path;

a second plurality of magenta color filters each comprised of a variable density color filter operated upon by a motor configured to traverse each of the second plurality of magenta color filters in and out of the light path;

a second plurality of yellow color filters each comprised of a variable density color filter operated upon by a motor configured to traverse each of the second plurality of yellow color filters in and out of the light path;

wherein each of the first plurality of magenta color filters, the first plurality of yellow color filters, and the first plurality of cyan color filters is comprised of a high saturation color pallet;

wherein each of the second plurality of magenta color filters, the second plurality of yellow color filters, and the second plurality of cyan color filters is comprised of an low saturation color pallet;

wherein the computer memory comprises operating software which is executed by the computer processor to cause the first plurality of yellow, cyan, and magenta filters to traverse independently into the light path by first, second, and third DMX control channels respectively;

and wherein the computer memory further comprises operating software which is executed by the computer processor to cause the second plurality of yellow, cyan and magenta filters to traverse independently into the light path by fourth, fifth and sixth DMX control channels respectively.

8. The apparatus for the theatrical lighting instrument of claim 7 further comprising a user control panel configured so that a user can select from the control panel a mode wherein multiplexing operational software stored in the computer memory is used by the computer processor to consolidate the traversing of the first plurality of cyan filters and the traversing of the second plurality of cyan filters in response to a first DMX channel of control.

9. The apparatus for the theatrical lighting instrument of claim 7 wherein a user control panel configured so that a user can select from the control panel a mode wherein multiplexing operational software stored in the computer memory is used by the computer processor, wherein in the mode, all of the first plurality and the second plurality of cyan filters are controlled by the computer processor to be consolidated and responsive to a first channel of DMX control, wherein in the mode, all of the first plurality and the second plurality of magenta filters are controlled by the computer processor to be consolidated and responsive to a second channel of DMX control; and wherein in the mode all of the first plurality and the second plurality of yellow filters are controlled by the computer processor to be consolidated and responsive to a third channel of DMX control.

10. The apparatus for the theatrical lighting instrument of claim 7 further comprising a user control panel configured so that a user can select from the control panel a mode wherein multiplexing operational software stored in the computer memory is used by the computer processor;

wherein in the mode, one or more of the first plurality and the second plurality of cyan filters are controlled by the computer processor to be moved in a manner to provide coarse adjustment of cyan filtering by a first coarse channel of DMX control and fine cyan adjustment of cyan filtering by a first fine channel of DMX control;

wherein in the mode, one or more of the the first plurality and the second plurality of magenta filters are controlled by the computer processor to be moved in a manner to provide coarse adjustment of magenta filtering by a second coarse channel of DMX control and fine magenta adjustment of magenta filtering by a second fine channel of DMX control;

wherein in the mode, all of the first plurality and the second plurality of yellow filters are controlled by the computer processor to be moved in a manner to provide coarse adjustment of yellow filtering by a third coarse yellow channel of DMX control and fine adjustment of yellow filtering by a third fine channel of DMX control.

11. The apparatus for the theatrical lighting instrument of claim 7 further comprising a user control panel configured so that a user can select from the control panel a mode wherein multiplexing operational software stored in the computer memory is used by the computer processor;

wherein in the mode, one or more of the first plurality and the second plurality of cyan filter, one or more of the first plurality and the second plurality of magenta filters, and one or more of the first plurality and the second plurality of yellow filters are controlled by the computer processor to be moved in a manner to provide hue adjustment of filtering by a hue channel of DMX control and saturation adjustment of filtering by a saturation channel of DMX control; and wherein the hue channel of DMX control and the saturation channel of DMX control differ from each other.

12. A method of a theatrical lighting instrument comprising the steps of:

multiplexing the traversing of a first plurality and a second plurality of cyan filters in and out of a light path of a light emitted by a light source, to a single first control channel;

multiplexing the traversing of a first plurality and a second plurality of magenta filters in and out of the light path of the light emitted by the light source, to a single second control channel;

multiplexing the traversing of a first plurality and a second plurality of yellow filters in and out of the light path of the light emitted by the light source, to a single third control channel;

wherein a lens is located in the light path, wherein the lens receives the light from the light source and projects the light from the light source;

each of the first plurality of cyan color filters is comprised of a variable density color filter operated upon by a motor configured to traverse each of the first plurality of cyan color filters in and out of the light path;

each of the first plurality of magenta color filters is comprised of a variable density color filter operated upon by a motor configured to traverse each of the first plurality of magenta color filters in and out of the light path;

each of the first plurality of yellow color filters is comprised of a variable density color filter operated upon by a motor configured to traverse each of the first plurality of yellow color filters in and out of the light path;

each of the second plurality of cyan color filters is comprised of a variable density color filter operated upon by a motor configured to traverse each of the second plurality of cyan color filters in and out of the light path;

each of the second plurality of magenta color filters is comprised of a variable density color filter operated upon by a motor configured to traverse each of the second plurality of magenta color filters in and out of the light path;

each of the second plurality of yellow color filters is comprised of a variable density color filter operated upon by a motor configured to traverse each of the second plurality of yellow color filters in and out of the light path;

wherein each variable density color filter of each of the first plurality of yellow color filters, cyan color filters, and magenta color filters are comprised of a high saturation color pallet; and wherein each variable density color filter of each of the second plurality of yellow color filters, cyan color filters, and magenta color filters are comprised of a low saturation color pallet.

13. The method of the theatrical lighting instrument of claim 12 further comprising storing computer software in a computer memory;

executing the computer software by use of a computer processor to cause the first plurality of cyan color filters to be traversed into the light path before the second plurality of cyan color filters is traversed into the light path.

14. The method of the theatrical lighting instrument of claim 12 further comprising storing computer software in a computer memory;

executing the computer software by use of a computer processor to cause the first plurality of magenta color filters to be traversed into the light path before the second plurality of magenta color filters is traversed into the light path.

15. The method of the theatrical lighting instrument of claim 12 further comprising storing computer software in a computer memory;

executing the computer software by use of a computer processor to cause the first plurality of yellow color filters to be traversed into the light path before the second plurality of yellow color filters is traversed into the light path.

16. A method of a theatrical lighting instrument comprising multiplexing a first plurality and a second plurality of color filters to operate by a hue command and saturation command received by a communication port;

wherein the first plurality of color filters include a first plurality of cyan color filters, a first plurality of magenta color filters, and a first plurality of yellow color filters;

wherein the second plurality of color filters include a second plurality of cyan color filters, a second plurality of magenta color filters, and a second plurality of yellow color filters;

wherein each of the first plurality of cyan color filters is comprised of a variable density color filter operated upon by a motor configured to traverse each of the first plurality of cyan color filters in and out of a light path of a light emitted by a light source;

wherein each of the first plurality of magenta color filters is comprised of a variable density color filter operated upon by a motor configured to traverse each of the first plurality of magenta color filters in and out of the light path;

wherein each of the first plurality of yellow color filters is comprised of a variable density color filter operated upon by a motor configured to traverse each of the first plurality of yellow color filters in and out of the light path;

wherein each of the second plurality of cyan color filters each comprised of a variable density color filter operated upon by a motor configured to traverse each of the second plurality of cyan color filters in and out of the light path;

wherein each of the second plurality of magenta color filters each comprised of a variable density color filter operated upon by a motor configured to traverse each of the second plurality of magenta color filters in and out of the light path; and wherein each of the second plurality of yellow color filters each comprised of a variable density color filter operated upon by a motor configured to traverse each of the second plurality of yellow color filters in and out of the light path.

17. The method of the theatrical lighting instrument of claim 15 wherein wherein the hue command is a sixteen bit command and the saturation command is a sixteen bit command.

18. A method of a theatrical lighting instrument comprising causing a first plurality of yellow, cyan, and magenta filters to traverse independently into a light path by first, second, and third DMX control channels respectively; and causing a second plurality of yellow, cyan and magenta filters to traverse independently into the light path by fourth, fifth and sixth DMX control channels respectively;

wherein the light path is of a light emitted by a light source;

wherein a lens which is located in the light path, and which receives light from the light source and projects light from the light source;

wherein each of the first plurality of cyan color filters is comprised of a variable density color filter operated upon by a motor configured to traverse each of the first plurality of cyan color filters in and out of the light path;

wherein each of the first plurality of magenta color filters is comprised of a variable density color filter operated upon by a motor configured to traverse each of the first plurality of magenta color filters in and out of the light path;

wherein each of the first plurality of yellow color filters is comprised of a variable density color filter operated upon by a motor configured to traverse each of the first plurality of yellow color filters in and out of the light path;

wherein each of the second plurality of cyan color filters each comprised of a variable density color filter operated upon by a motor configured to traverse each of the second plurality of cyan color filters in and out of the light path;

wherein each of the second plurality of magenta color filters each comprised of a variable density color filter operated upon by a motor configured to traverse each of the second plurality of magenta color filters in and out of the light path;

wherein each of the second plurality of yellow color filters each comprised of a variable density color filter operated upon by a motor configured to traverse each of the second plurality of yellow color filters in and out of the light path;

wherein each of the first plurality of magenta color filters, the first plurality of yellow color filters, and the first plurality of cyan color filters is comprised of a high saturation color pallet; and wherein each of the second plurality of magenta color filters, the second plurality of yellow color filters, and the second plurality of cyan color filters is comprised of an low saturation color pallet.

19. The method of the theatrical lighting instrument of claim 16 further comprising selecting a mode from a control panel to cause multiplexing operational software stored in a computer memory to be executed by a computer processor to consolidate the traversing of the first plurality of cyan filters and the traversing of the second plurality of cyan filters in response to a first DMX channel of control.

20. The method of the theatrical lighting instrument of claim 16 wherein selecting a mode from a control panel to cause multiplexing operational software stored in a computer memory to be executed by a computer processor to consolidate the traversing of the first plurality of cyan filters and the traversing of the second plurality of cyan filters in response to a first DMX channel of control;

wherein in the mode, all of the first plurality and the second plurality of cyan filters are controlled by the computer processor to be consolidated and responsive to a first channel of DMX control, wherein in the mode, all of the first plurality and the second plurality of magenta filters are controlled by the computer processor to be consolidated and responsive to a second channel of DMX control; and wherein in the mode all of the first plurality and the second plurality of yellow filters are controlled by the computer processor to be consolidated and responsive to a third channel of DMX control.

21. The method of the theatrical lighting instrument of claim 16 further comprising selecting a mode from a control panel to cause multiplexing operational software stored in a computer memory to be executed by a computer processor to consolidate the traversing of the first plurality of cyan filters and the traversing of the second plurality of cyan filters in response to a first DMX channel of control;

wherein in the mode, one or more of the first plurality and the second plurality of cyan filters are controlled by the computer processor to be moved in a manner to provide coarse adjustment of cyan filtering by a first coarse channel of DMX control and fine cyan adjustment of cyan filtering by a first fine channel of DMX control;

wherein in the mode, one or more of the the first plurality and the second plurality of magenta filters are controlled by the computer processor to be moved in a manner to provide coarse adjustment of magenta filtering by a second coarse channel of DMX control and fine magenta adjustment of magenta filtering by a second fine channel of DMX control; and wherein in the mode, all of the first plurality and the second plurality of yellow filters are controlled by the computer processor to be moved in a manner to provide coarse adjustment of yellow filtering by a third coarse yellow channel of DMX control and fine adjustment of yellow filtering by a third fine channel of DMX control.

22. The method of the theatrical lighting instrument of claim 16 further comprising selecting a mode from a control panel to cause multiplexing operational software stored in a computer memory to be executed by a computer processor to consolidate the traversing of the first plurality of cyan filters and the traversing of the second plurality of cyan filters in response to a first DMX channel of control;

wherein in the mode, one or more of the first plurality and the second plurality of cyan filter, one or more of the first plurality and the second plurality of magenta filters, and one or more of the first plurality and the second plurality of yellow filters are controlled by the computer processor to be moved in a manner to provide hue adjustment of filtering by a hue channel of DMX control and saturation adjustment of filtering by a saturation channel of DMX control; and wherein the hue channel of DMX control and the saturation channel of DMX control differ from each other.

* * * * *

UNITED STATES PATENT AND TRADEMARK OFFICE

CERTIFICATE OF CORRECTION

PATENT NO. : 10,260,692 B2
APPLICATION NO. : 15/653603
DATED : April 16, 2019
INVENTOR(S) : Richard S. Belliveau It is certified that error appears in the above-identified patent and that said Letters Patent is hereby corrected as shown below:

On the Title Page

Column 2, Abstract, Lines 11 and 13, replace “pallet” with -- palette --.

In the Specification

Column 2, Lines 52 and 54, replace “pallet” with -- palette --;

Column 3, Lines 31 and 34, replace “pallet” with -- palette --;

Column 4, Line 66, replace “pallet” with -- palette --;

Column 5, Line 3, replace “pallet” with -- palette --;

Column 8, Line 53, replace “pallet” with -- palette --;

Column 10, Line 33, replace “pallet” with -- palette --;

Column 11, Line 27, replace “pallet” with -- palette --; and

Column 14, Lines 35 and 39, replace “pallet” with -- palette --.

In the Claims

In Claim 7, Column 16, Line 20, replace “pallet” with -- palette --, Line 24, replace “an” with -- a -- and replace “pallet” with -- palette --;

In Claim 10, Column 17, Line 9, replace “the the” with -- the --;

In Claim 12, Column 18, Lines 23 and 27, replace “pallet” with -- palette --;

Signed and Sealed this
Eighteenth Day of October, 2022

Katherine Kelly Vidal

Katherine Kelly Vidal
*Director of the United States Patent and Trademark Office*

In Claim 17, Column 19, Line 30, replace "15" with -- 16 --; and

In Claim 18, Column 20, Line 14, replace "pallet" with -- palette --, Line 18, replace "an" with -- a -- and replace "pallet" with -- palette --.